C. B. MILLS.
INDUCTION REGULATOR.
APPLICATION FILED SEPT. 28, 1912.

1,177,349.

Patented Mar. 28, 1916.

WITNESSES:

INVENTOR
Chester B. Mills
BY
ATTORNEY

UNITED STATES PATENT OFFICE.

CHESTER B. MILLS, OF EAST McKEESPORT, PENNSYLVANIA, ASSIGNOR TO WESTINGHOUSE ELECTRIC AND MANUFACTURING COMPANY, A CORPORATION OF PENNSYLVANIA.

INDUCTION-REGULATOR.

1,177,349.  Specification of Letters Patent.   Patented Mar. 28, 1916.

Application filed September 28, 1912. Serial No. 722,971.

*To all whom it may concern:*

Be it known that I, CHESTER B. MILLS, a citizen of the United States, and a resident of East McKeesport, in the county of Allegheny and State of Pennsylvania, have invented a new and useful Improvement in Induction-Regulators, of which the following is a specification.

My invention relates to electric-circuit regulators and particularly to such transformer regulators as embody relatively movable primary and secondary windings in inductive relation and are known as induction regulators.

The object of my invention is to provide means, for promptly adjusting the movable part of a regulator of the class above indicated, without subjecting the operating mechanism to excessive shocks or wear that shall be dependent upon predetermined variations in an electric circuit, with which the regulator is associated.

A continuously operating electric motor has hitherto been employed for adjusting the movable member of an induction regulator in the one or the other direction, in response to variations on a regulated circuit, friction clutches and suitable gearing being interposed between the motor shaft and the movable member of the regulator for establishing suitable driving connections. An arrangement of this character has the advantage of producing relatively quick adjustments of the regulator and, consequently, the regulating system in which it is embodied can be made relatively sensitive. It has the disadvantage, however, of very quickly accelerating, in either the one or the other direction, a relatively large mass which not only necessitates the use of a relatively powerful motor but also large and strong clutches in order to avoid excessive wear.

According to my present invention, I avoid the use of mechanical clutches of any kind and, while I employ a continuously operating motor, it is so arranged as to easily effect the necessary adjustment of the movable member of the regulator without severe strains or shocks on any of the parts of the mechanism.

Figure 1:
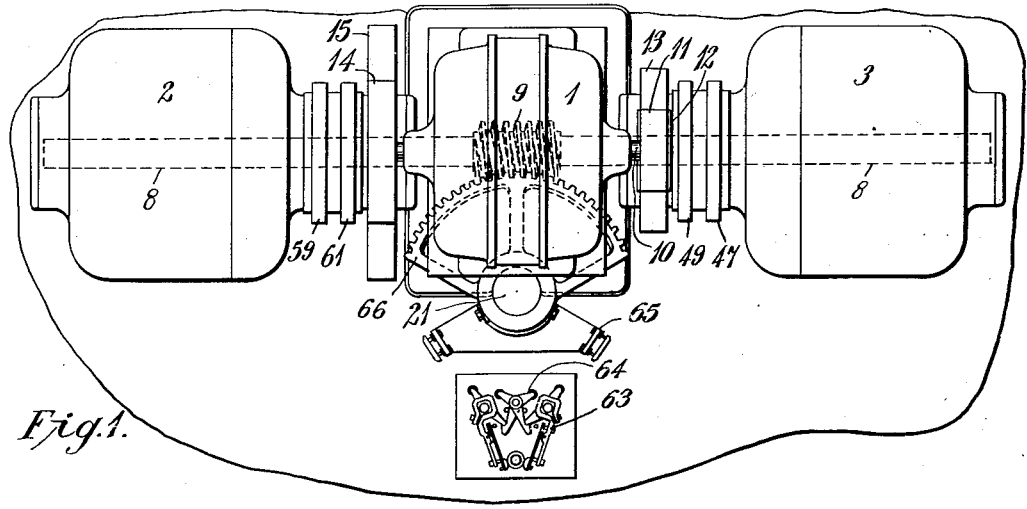
Figure 2:
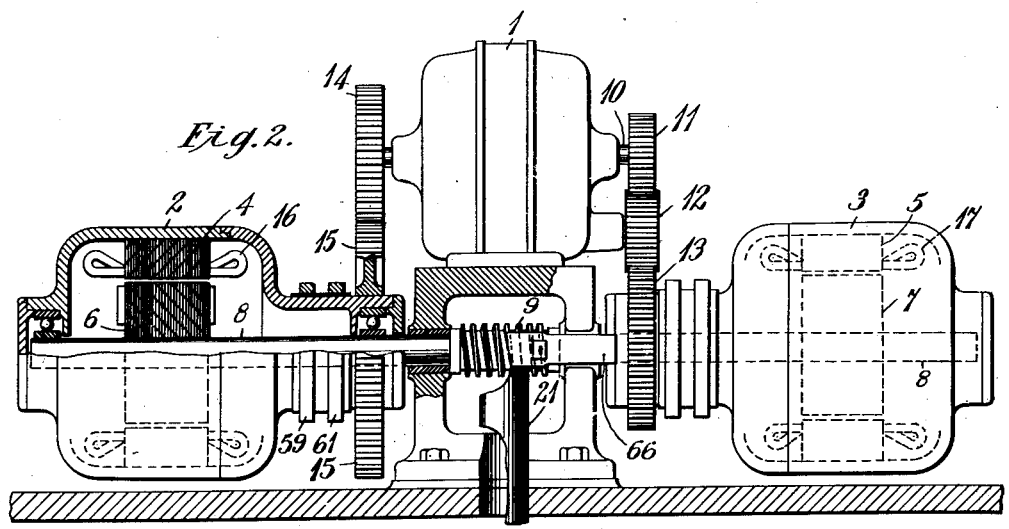
Figure 3:
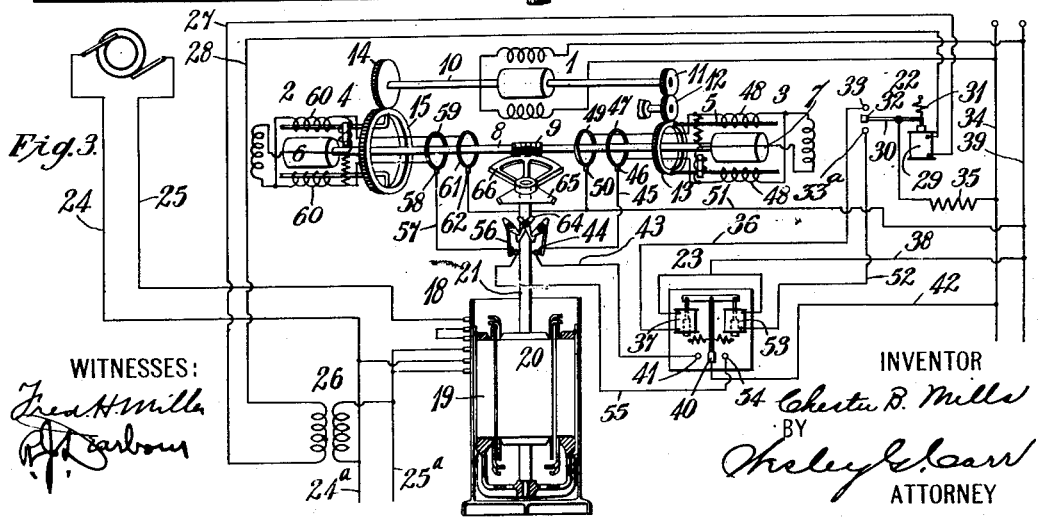

Figure 1 of the accompanying drawings is a plan view and Fig. 2 is a partially sectional elevation of the operating mechanism which forms a part of my invention. Fig. 3 is a diagrammatic view of a regulating system arranged in accordance with my invention and embodying the operating mechanism of the other figures.

Referring to Figs. 1 and 2 of the drawings, the operating mechanism comprises a continuously operating electric motor 1 and a pair of dynamo-electric machines 2 and 3, preferably of the induction type, having rotatable primary members 4 and 5 and rotatable secondary members 6 and 7, respectively.

The secondary members 6 and 7 are preferably of the squirrel cage type and are mounted on the same shaft 8 on opposite sides of a worm gear 9. One end of the motor shaft 10 is geared to the rotatable primary member 5 of the dynamo-electric machine 3 by spur gears 11, 12 and 13, and the opposite end of the motor shaft is operatively connected to the primary member 4 of the dynamo-electric machine 2 by spur gears 14 and 15.

The arrangement of parts is such that the motor is continuously driving the primary member 5 in one direction and the primary member 4 in the opposite direction of rotation, the rotatable secondaries 6 and 7, which are secured to the same shaft, being normally at rest except, when the movable member of the regulator is adjusted, as hereinafter pointed out.

The primary members 4 and 5 exert a torque upon the secondary members 6 and 7, respectively, only when current is supplied to the respective primary windings 16 and 17, because, under these conditions only, are rotating magnetic fields produced which may influence the secondary members 6 and 7. Therefore, when the primary windings of one of the dynamo-electric machines 2 or 3 are energized, a torque is exerted upon the corresponding secondary member 6 or 7, which causes the latter to rotate at substantially the same speed as the rotating magnetic field produced by the current flow through the corresponding primary winding, as hereinafter pointed out.

In order to make the operations of the dynamo-electric machines 2 and 3 perfectly clear, one of them will first be discussed.

Considering the machine 2, which is shown in Fig. 3 as a split-phase machine of a well known type if primary member 4 is assumed to be stationary when electric energy is supplied to the split-phase winding 16, a rotating magnetic field is produced which rotates relative to the primary member at synchronous speed. This rotating field which results from the alternating currents flowing through the split-phase winding 16 tends to cause the secondary member 6 to rotate at the same speed inasmuch as the actual difference in speed, or the slip, may be neglected in this discussion.

If the primary member 4 be assumed to rotate at one-half synchronous speed, in a direction opposite to the rotation of the rotating magnetic field produced by its windings, the actual speed of rotation of the rotating magnetic field, relative to a stationary body, will be substantially one-half synchronous speed. It is presumed that the winding is so interconnected as to generate a rotating magnetic field which rotates in a direction opposite to that of the primary member 4. Consequently, under these conditions, the secondary member 6 tends to rotate in a direction opposite to that of the primary member and at substantially the same speed as the primary member, inasmuch as the slip is assumed to be negligible.

If it is assumed that the primary member is rotated in the same direction as the rotating magnetic field which is produced by the winding 16 and at one-half synchronous speed, the rotating magnetic field will then be rotating relative to a stationary body at one and one-half times synchronous speed and the secondary member 6 will tend to rotate in the same direction as the primary member at a speed 50% above synchronous speed or 100% above the speed of rotation of the primary member 4. It is, therefore, possible, by driving the primary member 4 in the one or the other direction and suitably energizing its winding, to produce a rotation of the secondary member 6 such as is desired for the adjustment of the regulator.

By driving the primary members 2 and 3 in opposite directions at substantially one-half synchronous speed and opposite to the rotating magnetic fields produced by their respective windings 16 and 17, when energized, the shaft 8 and the secondary members 6 and 7, which are secured thereto, will be operated in either the one or the other direction at substantially one-half synchonous speed, according as the winding 16 or the winding 17 is energized.

Referring to Fig. 3 of the drawings, the system here shown comprises the operating mechanism of Figs. 1 and 2 (which bears the same reference characters in all of the figures) a regulator 18, having a stationary member 19, a movable member 20 and a shaft 21 which is geared to the worm gear 9; a primary relay switch 22, a secondary relay switch 23 and a distributing circuit 24—25.

Assuming that the parts occupy the positions indicated, if the voltage of the circuit 24—25 is increased, additional energy will be supplied through a voltage transformer 26 and conductors 27 and 28 to a magnet coil 29 of the primary relay switch 22. The coil 29, when thus energized above normal, actuates a lever 30 in opposition to a spring 31, and throws a movable contact member 32 into engagement with a stationary contact member 33. A circuit is then completed from a conductor 34 of an alternating current auxiliary source of energy, through a resistor 35, the contact members 32 and 33, a conductor 36, magnet coil 37 of the secondary relay 23, and a conductor 38 to the opposite conductor 39 of the auxiliary source.

When the secondary relay switch coil 37 is energized, a movable contact member 40 is moved into engagement with a stationary contact member 41 and another circuit is completed from the conductor 34, through a conductor 42, the contact members 40 and 41, a conductor 43, a limit switch 44, a conductor 45, a brush 46, a collector ring 47 of the dynamo-electric machine 3, primary windings 48 of the same machine, a collector ring 49, a brush 50 and a conductor 51 to the conductor 39. The primary member of the machine, when thus energized, exerts a torque upon the secondary member 7 and causes it to rotate at a predetermined speed in the desired direction. When the windings 48 are energized, a prompt rotative adjustment of the shaft 8 and the movable member of the regulator is effected. The acceleration of the shaft 8 and the adjustment of the regulator are, however, effected without subjecting either the driving or the driven parts to severe strains or shocks.

The arrangement of parts is such that the movable member 20 of the regulator 18 is so adjusted, when the primary windings 48 are energized, as to decrease the voltage of the distributing circuit 24ª—25ª.

As long as the potential of the distributing circuit is substantially constant at a predetermined value, the coil 29 of the primary relay switch 22 will be so energized as to balance the spring 31 and hold the movable contact member 32 between and out of engagement with the stationary contact members 33 and 33ª.

If the voltage of the distributing circuit falls slightly below the aforesaid predetermined value, the spring 31 will overcome the action of the magnet 29 and will move the contact member 32 into engagement with the stationary contact member 33ª. Under these conditions, a circuit is completed from the conductor 34, through the resistor 35, the contact members 32 and 33ª, a conductor 52, and a coil 53 of the secondary relay switch 23, and the conductor 38 to the conductor 39.

When the coil 53 of the secondary relay switch is energized, the contact member 40 is moved into engagement with a stationary contact member 54, completing a circuit from the conductor 42, through the contact members 40 and 54, a conductor 55, a limit switch 56, a conductor 57, a brush 58 and a collector ring 59 of the dynamo-electric machine 2, primary windings 60 of the same machine, a collector ring 61, a brush 62 and the conductor 51 to the conductor 39. It is, therefore, evident that the primary windings 48 and 60 of the dynamo-electric machines 3 and 2 are respectively energized according as coil 37 and 53 of the secondary relay switch 23 is energized. The secondary relay switch coils are energized in accordance with the position of the primary relay switch 22 and are, consequently, indirectly responsive to fluctuations above and below a predetermined value in the voltage of the distributing circuit 24ª and 25ª.

By reason of the worm and wheel connection between the movable member 20 of the regulator and the shaft 8, the movable member is adjusted through a relatively small angle by several rotations of the shaft.

The limit switches 44 and 56 are provided for the purpose of preventing over-running of the movable member of the regulator in either direction and, inasmuch as they form no part of my present invention, any suitable switch structure may be employed. As illustrated in Fig. 1 of the drawings, the limit switches each comprise an arm or contact finger 63 which is pivotally supported and is provided with a latch 64 to hold the switch closed and is adapted to be tripped by an arm 65 that is carried by a gear segment 66 which meshes with the worm gear 9, and is secured to the upper end of the regulator shaft.

If the voltage of the distributing circuit either increases or decreases to such an extent that the regulator is unable to correct it, the regulator will be adjusted in such direction as to effect the proper correction until one of the limit switches is tripped, the arrangement of parts being such that the circuit, through which the active primary winding is energized, is then interrupted and the regulator permitted to come to rest. The regulator, however, is still operative, since the other limit switch is closed, and may be adjusted in the reverse direction as soon as the voltage of the distributing circuit is restored to normal and fluctuates in the opposite direction.

The operating mechanism of my invention is adapted for various uses, although it is particularly applicable to automatic regulators of the induction type.

While I have shown the dynamo-electric machines 2 and 3 as split-phase machines which are supplied with single phase alternating current from the supply mains 34—39, it will be understood that the machines 2 and 3 may be replaced by other types of dynamo-electric machines which are well known in the art and which produce rotating magnetic fields to influence the secondary members 6 and 7, as hereinbefore mentioned. For the purposes of my invention, dynamo-electric machines supplied with polyphase alternating currents may be substituted for the machines 2 and 3 inasmuch as the action of the former, in producing rotating magnetic fields which, in turn, effect propulsion of the secondary members 6 and 7, is an equivalent, within the confines of my invention, of that produced by the dynamo-electric machines 2 and 3.

I desire that variations which do not depart from the spirit of my invention shall be included within its scope.

I claim as my invention:

1. The combination with a driven member, and a pair of dynamo-electric machines having one pair of rotatable members operatively connected to the driven member and a second pair of rotatable members, the members of at least one of said pairs being provided with windings which may be selectively energized with alternating currents to generate rotating magnetic fields to influence the members comprising the other said pair, of means for continuously driving one of said pairs of members.

2. The combination with a regulated element, a pair of dynamo-electric machines having secondary members operatively connected to the regulating element, rotatable primary members which are provided with windings to generate rotating magnetic fields when energized with alternating currents, of means for rotating the primary members of the two dynamo-electric machines and means for automatically selectively energizing the windings of said primary members.

3. The combination with a regulating element, a pair of dynamo-electric machines having secondary members operatively connected to the regulating element, rotatable primary members and windings therefor which generate rotating magnetic fields when energized with alternating currents, of means for rotating the primary members of the two dynamo-electric machines in opposite directions, and automatic means for selectively energizing the windings of the primary members, whereby the regulating element is adjusted in the one or the other direction.

4. The combination with a regulating element, a pair of dynamo-electric machines having rotatable secondary members operatively connected to the regulating element, rotatable primary members and windings therefor which generate rotating magnetic fields when energized with alternating currents, of a continuously operating electric motor for driving the primary members in opposite directions, and automatic means for selectively energizing the primary windings of the two dynamo-electric machines to generate rotating magnetic fields which will influence the one or the other of the secondary members as to selectively adjust the regulating element in the one or the other direction.

5. In a regulating system, the combination with a regulated element, a regulator having a movable member, a pair of dynamo-electric machines having secondary members operatively connected to the movable member of the regulator, rotatable primary members and windings therefor which generate rotating magnetic fields when energized with alternating currents, of means for continuously operating the primary members in opposite directions, and means responsive to variations in the regulated element for selectively energizing the primary windings of said dynamo-electric machines.

6. In a system of regulation, the combination with a distributing circuit, an electric regulator associated therewith and having a movable member, a pair of dynamo-electric machines, and secondary members operatively connected to said member, rotatable primary members and windings therefor which generate rotating magnetic fields when energized with alternating currents, and an electric motor for continuously operating the primary members in opposite directions, of a primary relay that is dependent upon electrical fluctuations in the distributing circuit for automatically and selectively energizing the one or the other of the primary windings.

7. In a regulating system, the combination with an alternating current distributing circuit, a transformer regulator associated therewith and having a movable member, a pair of dynamo-electric machines of the split-phase type having rotatable secondary members provided with squirrel cage windings and operatively connected to the movable member of the regulator, rotatable primary members having windings normally deënergized, said windings generating rotating magnetic fields when energized with alternating currents, an alternating current motor for continuously operating the primary members in opposite directions, and means dependent upon fluctuations in voltage in the distributing circuit above and below a predetermined value for automatically and selectively energizing the primary windings of the dynamo-electric machines.

8. The combination with a driven member, a pair of dynamo-electric machines, each having a rotatable primary and a rotatable secondary member, one at least of which is provided with a winding to generate a rotating magnetic field when energized with alternating current, one member of each machine being continuously operated and the other member of each being operatively connected to the driven member, of automatic means for selectively energizing the two dynamo-electric machines to produce opposite rotative adjustments of the driven member.

In testimony whereof, I have hereunto subscribed my name this 21st day of Sept., 1912.

CHESTER B. MILLS.

Witnesses:
 THOS. F. FISHER,
 B. B. HINES.